(12) United States Patent
Goto et al.

(10) Patent No.: US 8,212,516 B2
(45) Date of Patent: Jul. 3, 2012

(54) POWER SUPPLY SYSTEM

(75) Inventors: Shuji Goto, Kanagawa (JP); Takashi Tomita, Kanagawa (JP); Yukihito Makabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 416 days.

(21) Appl. No.: 12/525,925

(22) PCT Filed: Jan. 22, 2008

(86) PCT No.: PCT/JP2008/050814
§ 371 (c)(1),
(2), (4) Date: Aug. 5, 2009

(87) PCT Pub. No.: WO2008/096593
PCT Pub. Date: Aug. 14, 2008

(65) Prior Publication Data
US 2011/0001453 A1    Jan. 6, 2011

(30) Foreign Application Priority Data
Feb. 7, 2007 (JP) ................................ 2007-028035

(51) Int. Cl.
*H01M 10/44* (2006.01)
*H01M 8/04* (2006.01)
*B60K 1/00* (2006.01)
(52) U.S. Cl. .................... 320/101; 428/432; 180/65.3
(58) Field of Classification Search .................. 320/101
See application file for complete search history.

(56) References Cited

U.S. PATENT DOCUMENTS

| | | | |
|---|---|---|---|
| 5,714,874 A | 2/1998 | Bonnefoy | |
| 6,158,537 A | 12/2000 | Nonobe | |
| 6,953,100 B2 * | 10/2005 | Aberle et al. | 429/432 |
| 6,960,400 B2 * | 11/2005 | Hara et al. | 429/425 |
| 2003/0184256 A1 * | 10/2003 | Kopf et al. | 320/101 |
| 2005/0112420 A1 * | 5/2005 | Lai et al. | 429/13 |

FOREIGN PATENT DOCUMENTS

| | | |
|---|---|---|
| JP | 04-051466 | 2/1992 |
| JP | 07-153474 | 6/1995 |
| JP | 10-040931 | 2/1998 |
| JP | 2003-333708 | 11/2003 |
| JP | 2005-056764 | 3/2005 |

OTHER PUBLICATIONS

International Search Report dated Apr. 22, 2008, for corresponding Patent Application PCT/JP2008/050814.
International Preliminary Report and Written Opinion dated Aug. 11, 2009.

* cited by examiner

*Primary Examiner* — M'Baye Diao
(74) *Attorney, Agent, or Firm* — K&L Gates LLP (57) ABSTRACT

A power supply system is provided that includes a fuel cell as its energy source and has not only high energy density but also high power density and can respond to sharp change in the power consumption with simple means. In a power supply system, a fuel cell is connected to the input terminal of a DC/DC converter, and a lithium-ion secondary battery and a load are connected to the output terminal in parallel. A voltage measurement device that measures the terminal voltage of the secondary battery and a control microcomputer that sets the target output voltage of the converter are provided, and the target output voltage is set slightly higher than the terminal voltage. The fuel cell is operated within a power generation condition offering the highest fuel conversion efficiency.

11 Claims, 6 Drawing Sheets

POWER SUPPLY SYSTEM

CROSS REFERENCE TO RELATED APPLICATIONS

The present application is a National Stage of International Application No. PCT/JP2008/050814 filed on Jan. 22, 2008 and which claims priority to Japanese Patent Application No. 2007-028035 filed on Feb. 7, 2007, the entire contents of which are being incorporated herein by reference.

BACKGROUND

The present disclosure relates to a power supply system that includes a fuel cell as its energy source and has not only high energy density but also high power density.

In recent years, portable electronic apparatus such as cellular phones, notebook personal computers, digital cameras, and camcorders have a tendency that its power consumption increases along with enhancement in its functions and increase in the number of its functions. As the power supplies of these pieces of portable electronic apparatus, small primary batteries and secondary batteries are used in general.

Parameters showing the cell characteristics include the energy density and the power density. The energy density refers to the electric energy that can be supplied per unit mass or unit volume of the cell. The power density refers to the power output per unit mass or unit volume of the cell. The cell used in the portable electronic apparatus is required to have enhanced energy density and power density so that the cell can be compatible with further enhancement in the functions of the electronic apparatus and further increase in the number of functions of the electronic apparatus.

For example, a lithium-ion secondary battery, which is widely spread as the power supply of portable electronic apparatus currently, has an excellent characteristic of high power density. Furthermore, the energy density thereof is also comparatively high, and the volumetric energy density thereof reaches 400 Wh/L or higher. However, further great enhancement in the energy density of the lithium-ion secondary battery can not be expected unless materials thereof are greatly changed.

Therefore, a fuel cell is expected as the next-generation power supply for portable electronic apparatus, in order to keep compatibility with the portable electronic apparatus, for which the progression of further increase in the number of functions and the power consumption in the future is expected.

In the fuel cell, a fuel is supplied to the anode side and the fuel is oxidized, and air or oxygen is supplied to the cathode side and oxygen is reduced. In the whole fuel cell, reaction of oxidation of the fuel by oxygen occurs. As a result, the chemical energy of the fuel is efficiently converted to electric energy and extracted. Therefore, if refueling is continued, using the fuel cell as the power supply can be continued without charge, unless failure of the fuel cell occurs.

Experimental manufacturing of various fuel cells has been already performed, and part of the fuel cells has been put into practical use. Of these fuel cells, the fuel cells having the highest possibility of the use as the power supply for portable electronic apparatus are polymer electrolyte fuel cells (PEFC) having a proton-conducting polymer membrane as its electrolyte. Of the PEFCs, a direct methanol fuel cell (DMFC), in which methanol is supplied to the anode as the fuel without being reformed, has the highest possibility.

In the DMFC, the methanol as the fuel is supplied to the anode side as a low-concentration or high-concentration aqueous solution in general, and is oxidized to carbon dioxide in a catalyst layer on the anode side as represented by the following equation (1).

$$\text{Anode: } CH_3OH + H_2O \rightarrow CO_2 + 6H^+ + 6e^- \quad (1)$$

The hydrogen ions generated at this time pass through the proton-conducting polymer electrolyte membrane sandwiched between the anode and the cathode and move to the cathode side. The hydrogen ions react with oxygen in a catalyst layer on the cathode side as represented by the following equation (2), so that water is produced.

$$\text{Cathode: } 6H^+ + (3/2)O_2 + 6e^- \rightarrow 3H_2O \quad (2)$$

The reaction occurring in the whole DMFC is represented by the following reaction equation (3), which results from the synthesis of equation (1) and equation (2).

$$\text{Whole DMFC: } CH_3OH + (3/2)O_2 \rightarrow CO_2 + 2H_2O \quad (3)$$

It is expected that the volumetric energy density of the DMFC can realize magnitude greater than that of the volumetric energy density of the lithium-ion secondary battery by a factor of several times. However, as one of the problems of the DMFC, low power density is cited. Therefore, if it is attempted to generate the power for operating portable electronic apparatus by the fuel cell solely, there is concern that the size of the fuel cell becomes too large and the fuel cell can not be incorporated in the portable electronic apparatus as a result.

In addition, although the fuel cell is expected to have high energy density in theory, the fuel conversion efficiency (the ratio of the electric energy that can be actually extracted from the fuel to the theoretical value) and the power output are affected by the power generation current and the power generation voltage. Therefore, there is concern that the energy density that can be realized when a load is actually driven (hereinafter, referred to as the effective energy density) is significantly lowered. This point will be described below.

Figure 5:
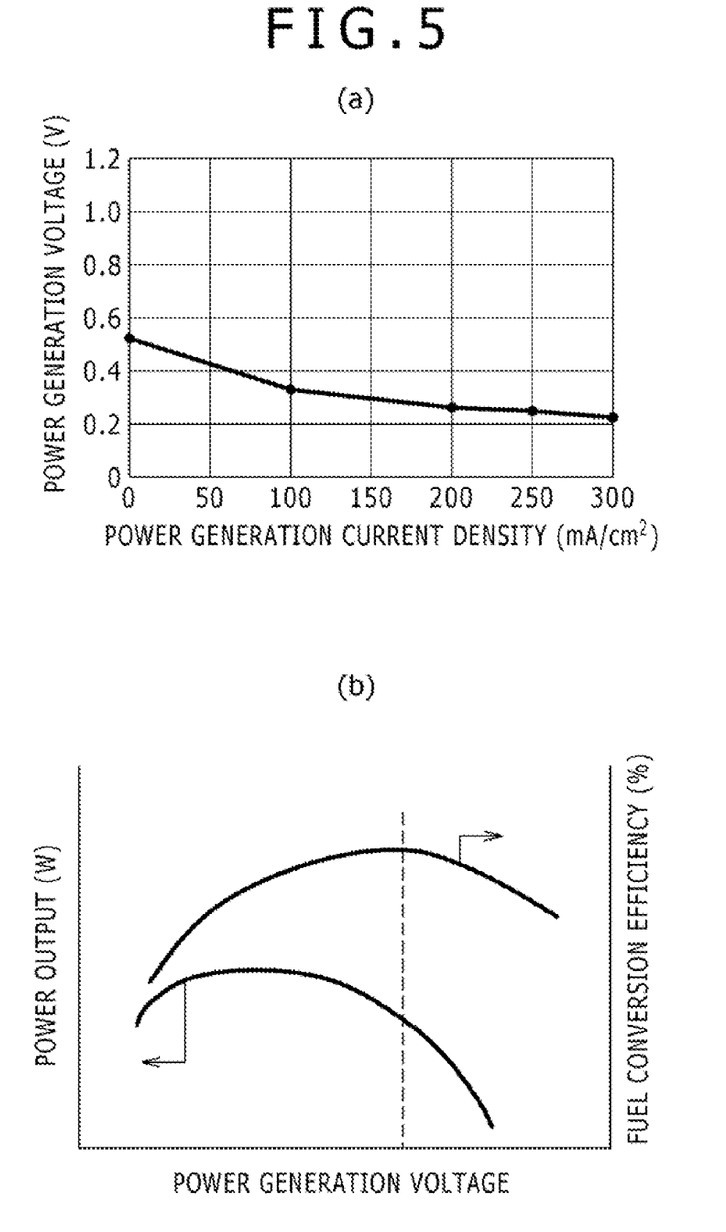

(a) of FIG. 5 is a graph showing a general current-voltage characteristic at the time of the power generation of the DMFC. Because polarization is large in the DMFC, the power generation voltage gradually decreases as the power generation current increases as shown in (a) of FIG. 5.

(b) of FIG. 5 is a graph showing the relationship among the power output, the fuel conversion efficiency, and the power generation voltage of the DMFC. The power output from the DMFC depends on the product of the power generation voltage and the power generation current. Therefore, the power output is low in the region in which the power generation voltage is high but the power generation current is small and in the region in which the power generation current is too large and thus the power generation voltage is lowered due to polarization. The power output takes the maximum value in the region intermediate between these regions. Furthermore, the fuel conversion efficiency of the DMFC is lowered due to methanol crossover and so on in the region in which the power generation current is small, and is lowered because of energy loss due to heat generation attributed to polarization in the region in which the power generation current is large. Therefore, the fuel conversion efficiency is the highest in the region intermediate between these regions. The methanol crossover refers to a phenomenon that the methanol moves from the anode side to the cathode side through the electrolyte membrane.

In order to enhance the effective energy density of the DMFC, it is desirable to cause the power generation of the DMFC in the region in which the fuel conversion efficiency is the highest (around the power generation voltage indicated by the dashed line in (b) of FIG. 5) and efficiently convert the chemical energy of the fuel to electric energy. However, the power consumption of portable electronic apparatus or the like as a load sharply changes with time, and thus the power output of the fuel cell also greatly increases and decreases correspondingly. Therefore, if the DMFC and the load are simply connected, the time zone during which the power generation of the DMFC can be caused in the region in which the fuel conversion efficiency is the highest hardly exists. Accordingly, the fuel conversion efficiency of the DMFC is significantly lowered and the electric energy that can be actually extracted from the DMFC is significantly decreased. As a result, there is fear that the effective energy density of the DMFC is lowered to a level equal to or lower than that of existing lithium-ion batteries.

Therefore, in order to enhance the effective energy density of the DMFC to a value close to the theoretical value, it is essential to provide contrivance for causing the DMFC to invariably perform the power generation in the region in which the fuel conversion efficiency is the highest irrespective of change in the power consumption of the load, such as contrivance for making a situation in which the DMFC can operate in such a manner as to keep constant power generation voltage, constant power generation current, or constant power generation output.

In order to solve these problems, Japanese Patent Laid-open No. Hei 10-40931 (Pages 2 and 7, FIGS. 1 and 4) and so on propose a hybrid power supply system in which a fuel cell and a secondary battery are connected to a load in parallel and at least one of the fuel cell and the secondary battery supplies power to the load. Japanese Patent Laid-open No. Hei 10-40931 includes the following description. Specifically, if such a configuration is employed, when the load is smaller than a predetermined amount and the power output of the fuel cell has a margin, driving of the load and charge of the secondary battery can be performed by the fuel cell. Furthermore, when the load is increased, the load can be driven by both of the fuel cell and the secondary battery. Thus, the capacity of each of the respective cells can be suppressed, and hence increase in the size of the power supply system can be suppressed.

Figure 6:
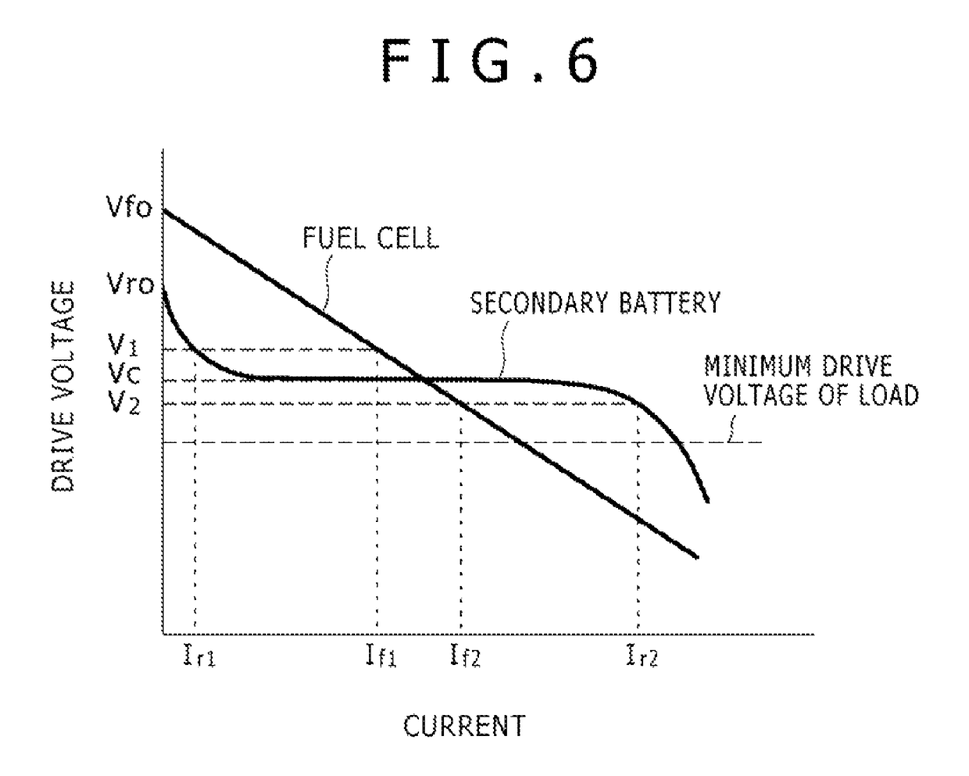
FIG. 6 is a graph showing the voltage-current characteristics of a fuel cell and a secondary battery, for explaining part of the operation of a power supply system described in Japanese Patent Laid-open No. Hei 10-40931.

FIG. 6 is a graph for explaining part of the operation of the above-described power supply system based on the current-voltage characteristics of the fuel cell and the secondary battery, shown in Japanese Patent Laid-open No. Hei 10-40931. The operating voltages of the fuel cell and the secondary battery, shown in FIG. 6, are each not the operating voltage of a single cell but the operating voltage of a cell stack obtained by connecting plural cells in series.

In the fuel cell, the power generation voltage decreases due to polarization as the power generation current increases as described above by taking the DMFC as an example. On the other hand, in the secondary battery such as a lithium-ion secondary battery, the region in which the discharge voltage does not change so greatly although the discharge current changes exists over a considerable range. The magnitude of the discharge voltage Vc at this time changes depending on the charge state. To drive the load, the fuel cell and the secondary battery need to be operated in the region in which the drive voltage equal to or higher than the minimum drive voltage of the load can be kept.

If the drive voltage when the load is small is defined as $V_1$ (>Vc), the currents supplied from the fuel cell and the secondary battery at this time are obtained as $I_{f1}$ and $I_{r1}$, respectively, from FIG. 6. Because $I_{f1} \gg I_{r1}$, most part of the power in this case is supplied from the fuel cell. On the other hand, if the drive voltage when the load is large is defined as $V_2$ (<Vc), the currents supplied from the fuel cell and the secondary battery at this time are obtained as $I_{f2}$ and $I_{r1}$, respectively, from FIG. 6. Because $I_{f2} < I_{r2}$, the power supplied from the secondary battery is higher than the power supplied from the fuel cell in this case.

While the load is increased and the drive voltage is decreased from $V_1$ to $V_2$ across Vc, the power generation current from the fuel cell only increases from $I_{f1}$ to $I_{f2}$. In contrast, the discharge current from the secondary battery greatly increases from $I_{r1}$ to $I_{r2}$. This shows that most part of the power consumption increased in this period is supplied from the secondary battery. Furthermore, if this increase in the power consumption is borne by only the fuel cell, the power generation voltage of the fuel cell is decreased to a level lower than the minimum drive voltage of the load as is apparent from FIG. 6. This shows that, if the power supply is formed with only the fuel cell, increase in size of the fuel cell is needed so that the power generation voltage equal to or higher than the minimum drive voltage can be kept, and that connecting the secondary battery excellent in the power density in parallel to the fuel cell allows size reduction of the fuel cell and hence size reduction of the whole power supply system.

Furthermore, Japanese Patent Laid-open No. 2003-333708 (Pages 3 to 5, FIGS. 1 and 2, Table 1) proposes a hybrid energy system. In this energy system, a converter (voltage converter) such as a DC/DC converter is connected in series to a fuel cell, and the equilibrium between the output voltage of the converter and the voltage of an energy storage device such as a secondary battery is permitted. In addition, the whole of the fuel cell and the converter is connected to the energy storage device and a load in parallel.

Table 1 shows the summary of main operating modes 1 to 4 in this hybrid energy system. In the table, SOC denotes the energy accumulation state of the energy storage device. SOCU denotes a predetermined high-accumulation state. SOCL denotes a predetermined low-accumulation state. For example, SOCU is the state in which energy of about 70 to 90% of the maximum accumulation amount is accumulated. SOCL is the state in which energy of about 20 to 50% is accumulated. $P_{FCOPT}$ denotes the power output when the fuel cell operates with the optimum efficiency. $P_{REQ}$ denotes the power output amount required by the load. In addition, E storage device is the abbreviation of the energy storage device.

TABLE 1

| accumulation state | load condition | energy storage device | fuel cell | load driving |
|---|---|---|---|---|
| 1 SOC > SOCU | | discharge | not operated | E storage device |
| 2 SOCU > SOC > SOCL | $P_{REQ}$ > $P_{FCOPT}$ | discharge | power generation with | E storage device + fuel cell |

TABLE 1-continued

| accumulation state | load condition | energy storage device | fuel cell | load driving |
|---|---|---|---|---|
| 3 | $P_{REQ} < P_{FCOPT}$ | charge | $P_{FCOPT}$ with optimum efficiency | fuel cell |
| 4 | SOCL > SOC | charge at maximum speed | power generation with high power output | fuel cell |

The above-described hybrid energy system operates based on plural operation principles. First, as long as the energy accumulation state SOC of the energy storage device is larger than the high-accumulation state SOCU (SOC>SOCU), the energy storage device supplies all of the power to the load and the fuel cell does not operate (operating mode 1). Second, if SOC is smaller than the high-accumulation state SOCU and larger than the low-accumulation state SOCL (SOCU>SOC>SOCL), the fuel cell operates with the optimum efficiency and generates power of $P_{FCOPT}$. If the power output amount $P_{REQ}$ required by the load exceeds $P_{FCOPT}$ ($P_{REQ}>P_{FCOPT}$), the energy storage device supplies the deficiency of the power (operating mode 2). On the other hand, if $P_{REQ}$ is smaller than $P_{FCOPT}$ ($P_{REQ}<P_{FCOPT}$)) excess power is accumulated in the energy storage device (operating mode 3). Third, if SOC is smaller than the low-accumulation state SOCL (SOCL>SOC), the fuel cell performs power generation of high power output to thereby supply all of the power to the load and accumulate power in the energy storage device at the maximum speed (operating mode 4).

A characteristic of this system is that, as seen in operating mode 1, the energy storage device is kept at the high-accumulation state as much as possible and not the fuel cell but the energy storage device responds to the energy requirement by the load as long as sufficient energy is accumulated in the energy storage device. Japanese Patent Laid-open No. 2003-333708 includes the following description. Specifically, if such a configuration is employed, the fuel cell can be operated with the optimum efficiency irrespective of change in the load, and the size of the fuel cell can be reduced. Furthermore, comparatively rapid response to change in the energy requirement by the load is permitted.

As is apparent from the description made with FIG. 6, in the power supply system of Japanese Patent Laid-open No. 10-40931, the characteristics of the system depend completely on the characteristics of the fuel cell and secondary battery that are used. For example, the discharge current from the secondary battery greatly increases around the point at which the drive voltage is decreased to Vc or lower, and this Vc depends on the current-voltage characteristic of the secondary battery. The magnitude of Vc changes depending on the charge state of the secondary battery, and thus the voltage corresponding to the start of the increase in the discharge current from the secondary battery changes depending on the charge state of the secondary battery.

Furthermore, in order for the fuel cell and the secondary battery to effectively exert the respective functions in this power supply system, the current-voltage curves of the respective cells need to intersect with each other in an appropriate region as shown in FIG. 6. In addition, in order to charge the secondary battery by the power output of the fuel cell, the power generation voltage of the fuel cell must be equal to or higher than the charge voltage of the secondary battery. The charge voltage of the secondary battery is higher than the open terminal voltage Vro thereof, and the power generation voltage of the fuel cell is lower than the open terminal voltage Vfo thereof. Therefore, the open terminal voltage Vfo of the fuel cell needs to be at least higher than the open terminal voltage Vro of the secondary battery.

As described above, in a simple power supply system in which a fuel cell stack and a secondary battery stack are merely connected in parallel like the power supply system of Japanese Patent Laid-open No. Hei 10-40931, the characteristics of the fuel cell and the characteristics of the secondary battery restrict each other, which causes a limit to enhancement in the system performance and stability.

As for the energy system of Japanese Patent Laid-open No. 2003-333708, there is ample room to enhance the system performance because the fuel cell is connected to the energy storage device and the load via the converter (voltage converter) such as the DC/DC converter. However, as is apparent from FIG. 2 in Japanese Patent Laid-open No. 2003-333708, the control step is complicated and the size of the control system becomes larger, which leads to higher cost.

SUMMARY

An object of the present embodiment is to provide a power supply system that includes a fuel cell as its energy source and has not only high energy density but also high power density and can respond to sharp change in the power consumption with simple means.

In an embodiment, a power supply system in which a fuel cell is connected to an input terminal of a direct-current voltage converter and a load and electric energy storage means are connected to an output terminal of the direct-current voltage converter in parallel, the power supply system comprising:

measurement means that measures the terminal voltage of the electric energy storage means and control means that sets the target output voltage of the direct-current voltage converter based on the terminal voltage, wherein the target output voltage is set higher than the terminal voltage, the fuel cell is operated within a predetermined power generation condition, if power that is generated by the fuel cell and output via the direct-current voltage converter is higher than the power consumption of the load, charge of the electric energy storage means by the direct-current voltage converter is automatically performed and the output voltage of the direct-current voltage converter is kept at the charge voltage of the electric energy storage means, and if power that is generated by the fuel cell and output via the direct-current voltage converter is lower than the power consumption of the load, discharge from the direct-current voltage converter to the load is automatically performed and the output voltage of the direct-current voltage converter is kept at the discharge voltage of the electric energy storage means.

In a power supply system in which a fuel cell and a secondary battery are directly connected in parallel like the power supply system proposed in Japanese Patent Laid-open No. Hei 10-40931, the characteristics of the fuel cell and the characteristics of the secondary battery restrict each other, which causes a limit to enhancement in the system performance and stability, as described above.

In contrast, in the power supply system of the present embodiment, the fuel cell is connected to the electric energy storage means and the load via the direct-current voltage converter. As is known, the direct-current voltage converter such as a DC/DC converter can set the output voltage on the output terminal side without depending on the input voltage on the input terminal side. Thus, in the power supply system of the present embodiment, the characteristics of the fuel cell and the characteristics of the electric energy storage means less restrict each other. Therefore, the optimum component can be selected as each of the fuel cell and the electric energy storage means and they can be operated almost independently of each other under the optimum operating condition of each of them.

As a result, on the input terminal side of the direct-current voltage converter, the fuel cell can be operated within a predetermined power generation condition irrespective of the magnitude of the load on the output terminal side and the charge state of the electric energy storage means. This predetermined power generation condition is e.g. a condition under which the fuel is supplied with the fuel supply rate offering the highest fuel conversion efficiency of the fuel cell and power with certain magnitude is generated. This can realize the power supply system having high energy density.

On the other hand, on the output terminal side of the direct-current voltage converter, the target output voltage is set higher than the terminal voltage of the electric energy storage means. However, the electric energy storage means is connected to the output terminal of the direct-current voltage converter in a short-circuited state or in a state close to a short-circuited state via current measurement means or the like. In addition, the fuel cell is operated within the predetermined power generation condition on the input terminal side. As a result of them, the output voltage of the direct-current voltage converter does not achieve the target output voltage.

Specifically, if the electric energy storage means is not connected to the output terminal, the output voltage of the direct-current voltage converter should achieve the target output voltage when the power generated by the fuel cell, which can be output via the direct-current voltage converter, is higher than the power consumption. However, actually the electric energy storage means is connected to the output terminal. Therefore, when the output voltage is just about to surpass the charge voltage of the electric energy storage means, charge of the electric energy storage means by the direct-current voltage converter is automatically started, so that the excess of the power generated by the fuel cell is rapidly captured in the electric energy storage means. As a result, the output voltage of the direct-current voltage converter is kept at the magnitude equal to the charge voltage of the electric energy storage means. Hereinafter, this operating mode will be referred to as the charge-and-drive mode.

Furthermore, if the electric energy storage means is not connected to the output terminal, when the power that is generated by the fuel cell and output via the direct-current voltage converter is lower than the power consumption, the generated power can not cover the power consumption and the output voltage of the direct-current voltage converter should significantly decrease to the vicinity of 0 V. However, actually the electric energy storage means is connected to the output terminal. Therefore, when the output voltage is just about to become lower than the discharge voltage of the electric energy storage means, discharge from the electric energy storage means to the load is automatically started, so that the deficiency of the power generated by the fuel cell is covered by the discharge from the electric energy storage means. As a result, the output voltage of the direct-current voltage converter is kept at the magnitude equal to the discharge voltage of the electric energy storage means. Hereinafter, this operating mode will be referred to as the discharge mode. In the discharge mode, the deficiency of the power generated by the fuel cell is covered by the discharge from the electric energy storage means. Therefore, the power supply system having high power density can be realized if a lithium-ion secondary battery or the like having high power density is used as the electric energy storage means.

Furthermore, if the power that is generated by the fuel cell and output via the direct-current voltage converter is almost equal to the power consumption of the load between the charge-and-drive mode and the discharge mode, neither the charge nor the discharge is performed but only the driving of the load by the power generated by the fuel cell is performed. Hereinafter, this operating mode will be referred to as the drive mode. Also in this drive mode, the output voltage of the direct-current voltage converter does not achieve the target output voltage but is kept at about the open terminal voltage intermediate between the charge voltage and the discharge voltage of the electric energy storage means.

In the hybrid energy system proposed in Japanese Patent Laid-open No. 2003-333708, the controller needs to specify which operating mode to employ from operating modes 1 to 4 as the operating mode of the system operation, and thus the control system is complicated. Not only the energy system of Japanese Patent Laid-open No. 2003-333708 but also most of conventional hybrid energy systems have a problem that the control system is complicated. In contrast, in the power supply system of the present embodiment, there is no circuit difference among the operating modes although they are named the charge-and-drive mode, the drive mode, and the discharge mode for convenience in order to briefly express the characteristics of the system operation. These modes are switched automatically and continuously depending on the magnitude relationship between the power that is generated by the fuel cell and output via the direct-current voltage converter and the power consumption of the load. Therefore, a hybrid energy system having high energy efficiency can be formed with the simple control means.

One of the reasons why the control that is simple and provides high energy efficiency is possible in the power supply system of the present embodiment is that, although the target output voltage is set for the direct-current voltage converter, the direct-current voltage converter does not actually achieve this target output voltage as described above. The main point of this feature will be complemented below.

Because the electric energy storage means is connected to the output terminal of the direct-current voltage converter in a short-circuited state or a state close to a short-circuited state, the output voltage of the direct-current voltage converter is equal or almost equal to the terminal voltage of the electric energy storage means. Therefore, when the output voltage is just about to surpass the charge voltage of the electric energy storage means, the electric energy storage means automatically starts charge to thereby keep the output voltage at the magnitude equal or almost equal to the charge voltage. Furthermore, when the output voltage is just about to become lower than the discharge voltage of the electric energy storage means, the electric energy storage means automatically starts discharge to thereby keep the output voltage at the magnitude equal or almost equal to the discharge voltage. In this manner, the output voltage is under effective dominance by the electric energy storage means and is kept at the magnitude equal or almost equal to the terminal voltage of the electric energy storage means.

On the other hand, if the target output voltage higher than the terminal voltage of the electric energy storage means is set, the direct-current voltage converter takes in the power generated by the fuel cell through the input terminal and outputs the power to the output terminal, for achieving the target output voltage. However, the direct-current voltage converter can not actually achieve the target output voltage because the output voltage is kept at the magnitude equal or almost equal to the terminal voltage. The direct-current voltage converter attempts to take in the power generated by the fuel cell through the input terminal as much as possible and output the power to the output terminal, and accordingly operates in the fall-off region where the output voltage starts to decrease due to power deficiency. As a result, the system composed of the fuel cell and the direct-current voltage converter functions like a constant voltage/current source that outputs the power generated by the fuel cell with the voltage equal to the terminal voltage of the electric energy storage means.

The characteristics of such a power supply system are exerted to the maximum extent in the case in which the output voltage of the direct-current voltage converter is completely dominated by the terminal voltage of the electric energy storage means, such as the case in which an energy source, such as a fuel cell, having low power output but high energy density is provided for a load by which high power consumption intermittently occurs in a pulse manner and electric energy storage means, such as a lithium-ion secondary battery, having high power output and capable of responding to the pulse-manner power consumption. This case is also the case to which a hybrid energy system is applied most effectively. Therefore, the power supply system of the present embodiment can be effectively applied to many cases in which the hybrid energy system is needed.

Additional features and advantages are described herein, and will be apparent from, the following Detailed Description and the figures.

BRIEF DESCRIPTION OF THE FIGURES

FIG. 3 is a sectional view (a) showing the structure of a fuel cell included in the power supply system based on the embodiment and an enlarged sectional view (b) of a membrane-electrode assembly (MEA).

FIG. 5 is a graph (a) showing a general voltage-current characteristic at the time of power generation of a DMFC and a graph (b) showing the relationship among the power output, the fuel conversion efficiency, and the power generation voltage of the DMFC.

DETAILED DESCRIPTION

In the power supply system of an embodiment, it is preferable that the target output voltage of the direct-current voltage converter be set slightly higher than the terminal voltage of the electric energy storage means. The power supply system of the embodiment can operate if the target output voltage is set higher than the terminal voltage. However, if the target output voltage is set unnecessarily high, the power generation of the fuel cell is performed under a condition departing from the predetermined power generation condition, and the energy efficiency of the voltage conversion by the direct-current voltage converter (hereinafter, referred to simply as the voltage conversion efficiency) is lowered. Thus, the energy efficiency as the power supply system is lowered.

The reason for the above description is as follows. As described above, the output voltage of the direct-current voltage converter is equal or almost equal to the terminal voltage of the electric energy storage means. Therefore, the difference between the target output voltage and the terminal voltage is equal or almost equal to the difference between the target output voltage and the output voltage that is actually realized in the direct-current voltage converter. The state in which this difference is large is equivalent to the state in which the direct-current voltage converter operates in such a manner as to considerably deeply enter the fall-off region. Therefore, for decreasing the difference, the direct-current voltage converter attempts to extract the generated power from the fuel cell under a condition departing from the predetermined power generation condition, and the direct-current voltage converter itself operates under a condition with low voltage conversion efficiency. Thus, the energy efficiency as the power supply system is lowered.

In this case, it is preferable that the target output voltage be adjusted and power generation by the fuel cell be controlled based on the difference between the target output voltage and the terminal voltage. As described above, by changing the magnitude of this difference, the operating state of the direct-current voltage converter and the condition in the extraction of the generated power from the fuel cell can be changed.

On this occasion, it is preferable that, by changing the difference between the target output voltage and the terminal voltage, the power generation voltage of the fuel cell be so controlled as to fall within a predetermined range, the power generation current of the fuel cell be so controlled as to fall within a predetermined range, or the power generated by the fuel cell be so controlled as to fall within a predetermined range.

For example, it is preferable that the target output voltage be so set that the input voltage of the direct-current voltage converter, i.e. the power generation voltage of the fuel cell, is equal to or higher than a predetermined value a and equal to or lower than a predetermined value b. The predetermined value a of the input voltage of the direct-current voltage converter is a sufficiently large voltage value that allows high-efficiency voltage conversion by the direct-current voltage converter. The power generation voltages of the fuel cell from the predetermined value a to the predetermined value b are voltage values that allow the fuel cell to generate power with high fuel conversion efficiency.

Alternatively, it is preferable that the target output voltage be so set that the input current of the direct-current voltage converter, i.e. the power generation current of the fuel cell, is equal to or larger than a predetermined value c and equal to or smaller than a predetermined value d. The current values from the predetermined value c to the predetermined value d are sufficiently large current values that allow high-efficiency voltage conversion by the direct-current voltage converter, and are current values that allow the fuel cell to generate power with high fuel conversion efficiency.

Alternatively, it is preferable that the target output voltage be so set that the input power of the direct-current voltage converter, i.e. the power generated by the fuel cell, is equal to or higher than a predetermined value e and equal to or lower than a predetermined value f. The power values from the predetermined value e to the predetermined value f are power values that can provide a sufficiently high fuel cell voltage allowing high-efficiency voltage conversion by the direct-current voltage converter, and are power values that allow the fuel cell to generate power with high fuel conversion efficiency.

Alternatively, on this occasion, it is preferable that, by changing the difference between the target output voltage and the terminal voltage, the output current of the direct-current voltage converter be so controlled as to fall within a predetermined range or the output power of the direct-current voltage converter be so controlled as to fall within a predetermined range.

For example, it is preferable that the target output voltage be so set that the output current of the direct-current voltage converter is equal to or larger than a predetermined value g and equal to or smaller than a predetermined value h. The output currents of the direct-current voltage converter from the predetermined value g to the predetermined value h are current values that permit the fuel cell to keep a sufficiently high power generation voltage allowing high-efficiency voltage conversion by the direct-current voltage converter, and are current values that allow the fuel cell to generate power with high fuel conversion efficiency.

Alternatively, it is preferable that the target output voltage be so set that the output power of the direct-current voltage converter is equal to or higher than a predetermined value i and equal to or lower than a predetermined value j. The current values from the predetermined value i to the predetermined value j are power values that permit the fuel cell to keep a sufficiently high power generation voltage allowing high-efficiency voltage conversion by the direct-current voltage converter, and are power values that allow the fuel cell to generate power with high fuel conversion efficiency.

Furthermore, it is preferable that, by power that is generated by the fuel cell and output via the direct-current voltage converter,

- a charge mode in which only charge of the electric energy storage means is performed,
- a charge-and-drive mode in which charge of the electric energy storage means and power supply to the load are performed, and
- a drive mode in which only power supply to the load is performed be carried out, and
- by power that is generated by the fuel cell and output via the direct-current voltage converter and discharge output of the electric energy storage means,
- a discharge mode in which power supply to the load is performed be carried out. The charge mode is the mode for charging the electric energy storage means in a spare time zone during which electronic apparatus or the like as the load is not used, and so on. Due to the possession of this mode used exclusively for charge, the power supply system of the present embodiment can be formed by using a fuel cell having lower power output as the fuel cell.

Furthermore, it is preferable that the control means be formed of a microcomputer. To simply carry out the control, it is favorable to utilize an existing microcomputer. However, the control means is not limited thereto but may be formed of another logic circuit, a switching device, or the like.

Furthermore, it is preferable that the fuel cell be a direct methanol fuel cell (DMFC). Polymer electrolyte fuel cells (PEFC) employ a solid polymer proton-conducting membrane as the electrolyte and therefore have excellent characteristics that are not found in other fuel cells, such as the absence of electrolyte scattering, robustness against vibration, possibility of reduction in size and weight, and high power density. Of the PEFCs, the DMFC has an advantage that the device size can be decreased because it requires no reformer.

However, the fuel cell is not limited thereto but can include one kind or plural kinds of fuel cells such as other polymer electrolyte fuel cells (PEFC), phosphoric acid fuel cells (PAFC), molten carbonate fuel cells (MCFC), solid oxide fuel cells (SOFC), and alkaline fuel cells (AFC). It is also possible to use plural fuel cells in series or in parallel.

Furthermore, it is preferable that the electric energy storage means be a lithium-ion secondary battery. Because the lithium-ion secondary battery has high power density, it can effectively compensate the weakness of the fuel cell having low power density and can respond to the requirement for high power by the load without increasing the size of the fuel cell. That is, the power supply system having not only high energy density but also high power density can be realized.

However, the electric energy storage means is not limited thereto but can include one kind or plural kinds of electric energy storage devices such as lithium batteries, lithium-ion polymer batteries, nickel-hydrogen batteries, nickel-cadmium batteries, and ultracapacitors. It is also possible to use plural electric energy storage means in series or in parallel.

A power supply system based on an embodiment will be described in detail below with reference to the drawings. This power supply system is an example in which the above-described fuel cell is a direct methanol fuel cell (DMFC) 1, the above-described direct-current voltage converter is a DC/DC converter 2, the above-described electric energy storage means is a lithium-ion secondary battery 3, and the above-described control means is a control microcomputer 5.

Figure 1:
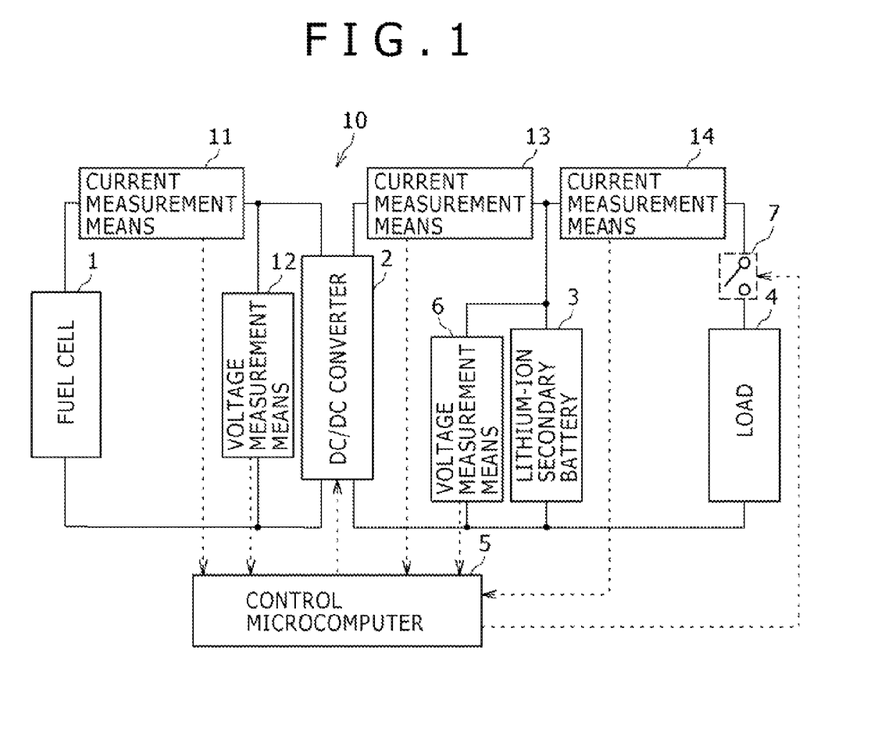
FIG. 1 is an explanatory diagram showing the configuration of a power supply system based on an embodiment.

FIG. 1 is an explanatory diagram showing the configuration of a power supply system 10 based on the embodiment. The power supply system 10 is composed mainly of the fuel cell 1, the DC/DC converter 2, the lithium-ion secondary battery 3, and the control microcomputer 5. The output of the fuel cell 1 is connected to the input terminal of the DC/DC converter 2. The lithium-ion secondary battery 3 and a load 4 are connected to the output terminal of the DC/DC converter 2 in parallel. As each of the fuel cell 1 and the lithium-ion secondary battery 3, not a single cell but a cell stack obtained by connecting plural cells in series is used in general.

The DC/DC converter 2 may be a normal DC/DC converter. However, it needs to be so configured that a reference voltage corresponding to the target output voltage of the DC/DC converter 2 can be applied to the reference voltage input terminal of the error amplifier.

The load 4 is portable electronic apparatus such as a cellular phone, a notebook personal computer, a digital camera, or a camcorder. The power consumed by measurement means and control means in the power supply system 10 is supplied separately from the load 4.

In the power supply system 10, a voltage measurement device 6 is provided as measurement means for the terminal voltage of the lithium-ion secondary battery 3, and a switch 7 for separating the lithium-ion secondary battery 3 from the load 4 in the charge mode is provided. Furthermore, as means for measuring the operating state of the fuel cell 1, current measurement means 11 for measuring the power generation current and voltage measurement means 12 for measuring the power generation voltage may be provided according to need. In addition, current measurement means 13 for measuring the output current of the DC/DC converter 2 and current measurement means 14 for measuring the drive current flowing into the load may be provided. The discharge or charge current flowing from/to the lithium-ion secondary battery 3 can be obtained as the difference between the current values of the above-described both currents, although current measurement means for measuring the currents may be separately provided. These means 11 to 14 are to make the operation of the power supply system 10 clear experimentally, and all of the means 11 to 14 are not needed in the power supply system at the practical-use stage.

The measurement data by these means are input to the control microcomputer 5. The control computer 5 controls the operation of the DC/DC converter 2 and the opening and closing of the switch 7 based on a predetermined control method. The power supply system 10 has four operating modes dependent on the difference in the presence/absence and magnitude of the power consumption in the load 4. This is shown in Table 2. In the table, "power consumption in power supply system" refers to the power consumed for the operation of the power supply system and is the total of the power consumed in the control means and the measurement means, the power consumed in the DC/DC converter, and the power consumed in means for fuel supply to the fuel cell 1.

TABLE 2

| mode | power consumption in load | relationship between power consumption and fuel cell output | lithium-ion secondary battery |
|---|---|---|---|
| charge mode | absent | power consumption in power supply system < fuel cell output | charge |
| charge-and-drive mode | low | power consumption in (load + power supply system) < fuel cell output | charge |
| drive mode | somewhat high | power consumption in (load + power supply system) = fuel cell output | without charge and discharge |
| discharge mode | high | power consumption in (load + power supply system) > fuel cell output | discharge |

The charge mode is the case in which the power consumption in the load 4 is absent. In this mode, the power generated by the fuel cell 1 is used as the power for charging the lithium-ion secondary battery 3 and the power consumed in the power supply system 10 via the DC/DC converter 2. Only in the case of this mode, the switch 7 is set to the off-state in order to separate the load 4 from the lithium-ion secondary battery 3. In the case of the other modes, the switch 7 is set to the on-state. The charge mode is the mode for charging the lithium-ion secondary battery 3 in a spare time zone during which the electronic apparatus or the like as the load 4 is not used, and so on. Due to the possession of this mode, the power supply system 10 can be formed with a fuel cell having lower power output.

The charge-and-drive mode is the case in which the power consumption in the load 4 is low. In this mode, the power generated by the fuel cell 1 is used as the power for charging the lithium-ion secondary battery 3 and the power consumed in the load 4 and the power supply system 10 via the DC/DC converter 2.

The drive mode is the case in which the power consumption in the load 4 is somewhat high. In this mode, the power generated by the fuel cell 1 is used as the power consumed in the load 4 and the power supply system 10 via the DC/DC converter 2, and the charge and discharge of the lithium-ion secondary battery 3 are not performed.

The discharge mode is the case in which the power consumption in the load 4 is high. In this mode, the power generation output of the fuel cell 1 via the DC/DC converter 2 and the discharge output of the lithium-ion secondary battery 3 are used as the power consumed in the load 4 and the power supply system 10. In this operating mode, the deficiency of the power generated by the fuel cell 1 is covered by the lithium-ion secondary battery 3. This allows compatibility with high power consumption caused by the load 4 in a short-time pulse manner without increasing the size of the fuel cell 1, and thus can realize the power supply system 10 having high power density.

Figure 2:
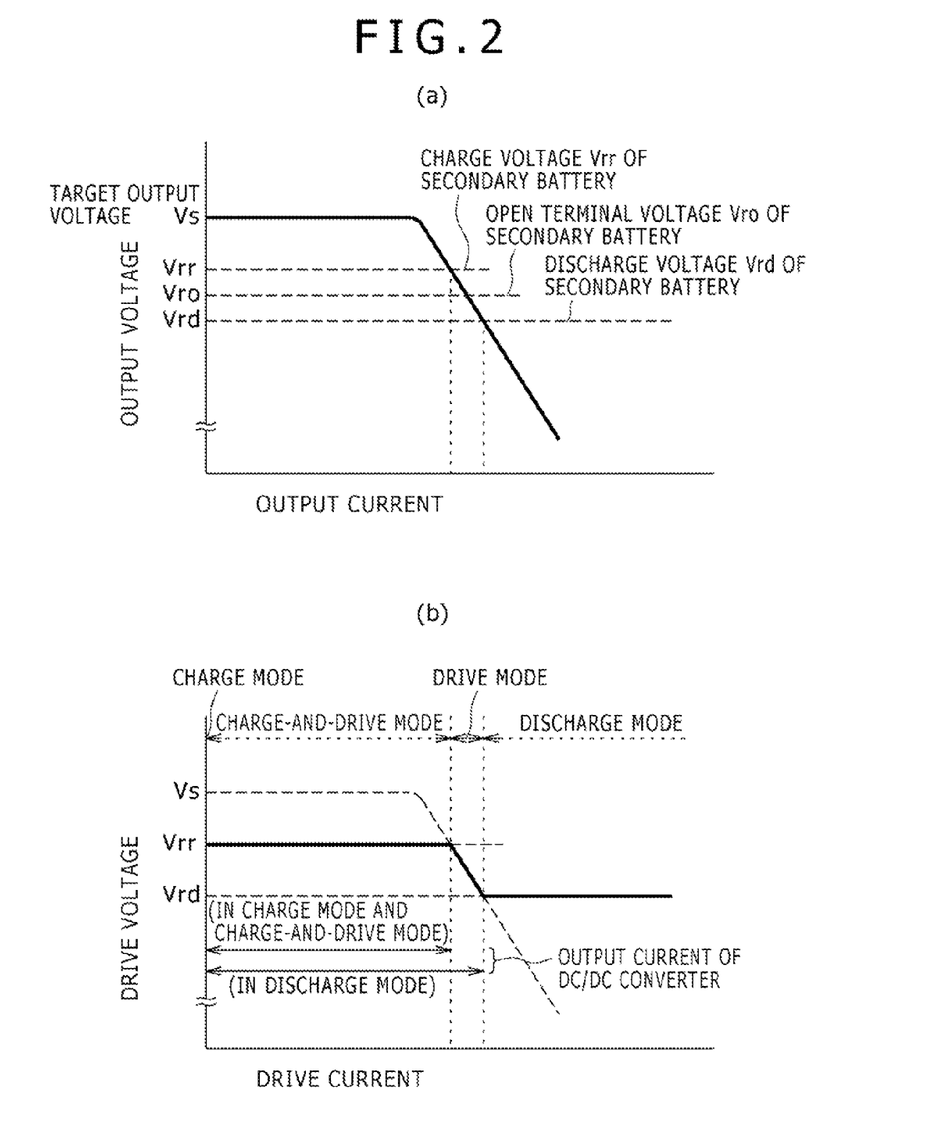
FIG. 2 is an explanatory diagram showing the operation of the power supply system based on the embodiment.

FIG. 2 is an explanatory diagram showing the operation of the power supply system 10. A characteristic of the power supply system 10 based on the present embodiment is that three operating modes of the charge-and-drive mode, the drive mode, and the discharge mode are switched automatically and continuously depending on the magnitude relationship between the power generated by the fuel cell 1 and the power consumption in the load 4. The operation of the power supply system 10 will be described below with use of FIG. 2.

(a) of FIG. 2 is a graph showing the current-voltage characteristic when a system composed of the fuel cell 1 that generates power with constant power output and the DC/DC converter 2 drives the load 4 solely without being connected to the lithium-ion secondary battery 3. The target output voltage Vs of the DC/DC converter 2 is assumed to be set higher than the open terminal voltage Vro of the lithium-ion secondary battery 3.

When the output current is small, i.e. when the power consumption of the load 4 is low and the power generated by the fuel cell 1 is higher than this power consumption, the output voltage of the DC/DC converter 2 achieves the target output voltage Vs as shown on the left side of (a) of FIG. 2. On the other hand, when the output current is large, i.e. when the power consumption of the load 4 is high and the power generated by the fuel cell 1 is lower than this power consumption and therefore deficient, the output voltage of the DC/DC converter 2 can not achieve the target output voltage Vs but enters the fall-off region to rapidly decrease to the vicinity of 0 V as the output current increases, as shown on the right side of (a) of FIG. 2.

(b) of FIG. 2 is a graph showing the current-voltage characteristic in the case of the power supply system 10 in which the system composed of the fuel cell 1 that generates power with constant power output and the DC/DC converter 2 is connected in parallel to the lithium-ion secondary battery 3 and drives the load 4. The target output voltage Vs of the DC/DC converter 2 is assumed to be set higher than the open terminal voltage Vro of the lithium-ion secondary battery 3.

When the power supply system 10 operates in the charge-and-drive mode shown on the left side of (b) of FIG. 2, i.e. when the power consumption of the load 4 is low and the power generated by the fuel cell 1 is higher than this power consumption, the output voltage of the DC/DC converter 2 will achieve the target output voltage as shown in (a) of FIG. 2 if the lithium-ion secondary battery 3 is not connected to the output terminal. However, actually the lithium-ion secondary battery 3 is connected to the output terminal of the DC/DC converter 2 via the current measurement means 13 in a substantially short-circuited state. Therefore, when the output voltage of the DC/DC converter 2 is just about to surpass the charge voltage Vrr of the lithium-ion secondary battery 3, charge of the lithium-ion secondary battery 3 by the DC/DC converter 2 is automatically started, so that the excess of the power generation current of the fuel cell 1 is rapidly captured in the lithium-ion secondary battery 3. As a result, the output voltage of the DC/DC converter 2 is kept at the magnitude equal to the charge voltage Vrr of the lithium-ion secondary battery 3, and the system composed of the fuel cell 1 and the DC/DC converter 2 functions like a constant voltage/current source that outputs the power generated by the fuel cell 1 with the voltage equal to the charge voltage Vrr. In this case, the following relationship is satisfied.

(the output current of the DC/DC converter 2)=(the drive current for driving the load 4)+(the charge current for charging the lithium-ion secondary battery 3)

When the power supply system 10 operates in the discharge mode shown on the right side of (b) of FIG. 2, i.e. when the power consumption of the load 4 is high and the power generated by the fuel cell 1 is lower than this power consumption, the output voltage of the DC/DC converter 2 will rapidly decrease to the vicinity of 0 V as the output current increases as shown in (a) of FIG. 2 if the lithium-ion secondary battery 3 is not connected to the output terminal. However, actually the lithium-ion secondary battery 3 is connected to the output terminal of the DC/DC converter 2 in a substantially short-circuited state. Therefore, when the output voltage of the DC/DC converter 2 is just about to become lower than the discharge voltage Vrd of the lithium-ion secondary battery 3, discharge from the lithium-ion secondary battery 3 to the load 4 is automatically started, so that the deficiency of the power generated by the fuel cell 1 is covered by the lithium-ion secondary battery 3. As a result, the output voltage of the DC/DC converter 2 is kept at the magnitude equal to the discharge voltage Vrd of the lithium-ion secondary battery 3, and the system composed of the fuel cell 1 and the DC/DC converter 2 functions like a constant voltage/current source that outputs the power generated by the fuel cell 1 with the voltage equal to the discharge voltage Vrd. In this case, the following relationship is satisfied.

(the drive current for driving the load 4)=(the output current of the DC/DC converter 2)+(the discharge current from the lithium-ion secondary battery 3)

In the discharge mode, the deficiency of the power generated by the fuel cell 1 is covered by the discharge of the lithium-ion secondary battery 3. Thus, the power supply system having high power density can be realized.

Furthermore, also when the power supply system 10 operates in the drive mode intermediate between the charge-and-drive mode and the discharge mode, i.e. also when the power that is generated by the fuel cell 1 and output via the DC/DC converter 2 is almost equal to the power consumption of the load 4, the output voltage of the DC/DC converter 2 does not achieve the target output voltage. This is due to the following reason. Specifically, even if the output voltage of the DC/DC converter 2 attempts to become higher than the charge voltage Vrr, the charge of the lithium-ion secondary battery 3 occurs. Furthermore, even if the output voltage attempts to become lower than the discharge voltage Vrd, the discharge of the lithium-ion secondary battery 3 occurs. As a result, the output voltage of the DC/DC converter 2 is kept at about the open terminal voltage Vro intermediate between the charge voltage Vrr and the discharge voltage Vrd of the lithium-ion secondary battery 3. In this case, neither the charge nor the discharge is performed but only the driving of the load 4 by the power generated by the fuel cell 1 is performed. That is, the following relationship is satisfied.

(the output current of the DC/DC converter 2)=(the drive current for driving the load 4)

The summary of the above description is as follows. In all of three operating modes of the charge-and-drive mode, the drive mode, and the discharge mode of the power supply system 10, the system composed of the fuel cell 1 that generates constant power and the DC/DC converter 2 functions like a constant-voltage constant-current power supply that gives almost constant output current with almost constant output voltage. The excess/deficiency of this output current with respect to the drive current for driving the load is automatically adjusted by the charge or discharge of the lithium-ion secondary battery 3.

Figure 3:
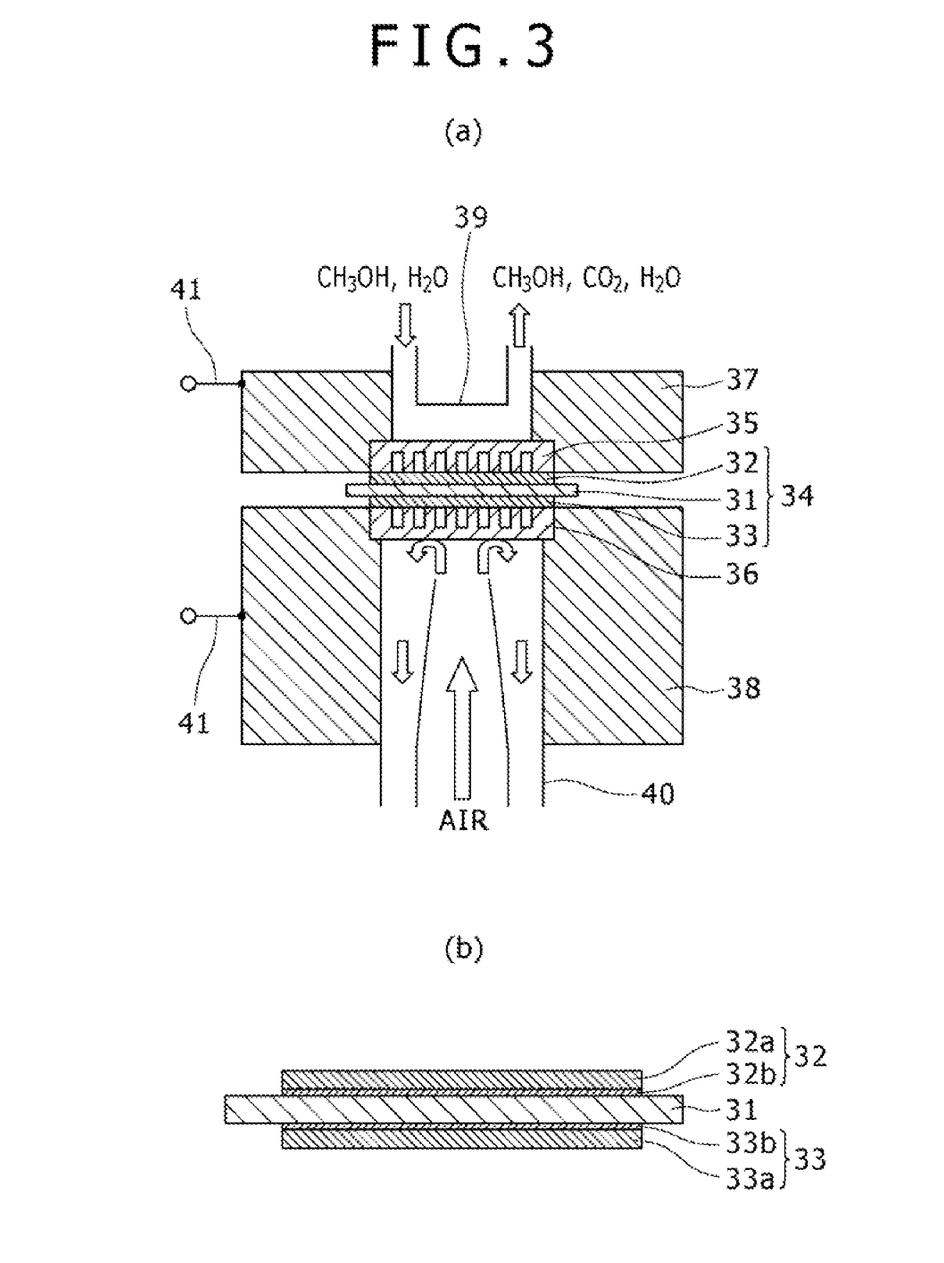

FIG. 3 is a schematic sectional view (a) showing the structure of the fuel cell 1 formed as a DMFC and an enlarged sectional view (b) of a membrane-electrode assembly (MEA) 34.

In the fuel cell 1, the membrane-electrode assembly (MEA) 34 is formed by bonding a fuel electrode (anode) 32 and an oxygen electrode (cathode) 33 to both surfaces of a proton-conducting polymer electrolyte membrane 31 of Nafion(R) or the like. As shown in (b) of FIG. 3, in the fuel electrode 32, an oxidation catalyst layer 32b composed of a mixture between platinum, a platinum alloy, or the like as a catalyst and a proton conductor such as Nafion(R) is formed on the surface of an electrically-conductive porous support 32a such as a carbon sheet or a carbon cloth. Furthermore, in the oxygen electrode 33, a reduction catalyst layer 33b composed of a mixture between platinum, a platinum alloy, or the like as a catalyst and a proton conductor such as Nafion(R) is formed on the surface of an electrically-conductive porous support 33a such as a carbon sheet or a carbon cloth.

The membrane-electrode assembly (MEA) 34 is sandwiched between a cell upper-half part 37 and a cell lower-half part 38 and incorporated into the fuel cell 1. A fuel supply tube 39 and an oxygen (air) supply tube 40 are provided for the cell upper-half part 37 and the cell lower-half part 38, respectively. A methanol aqueous solution is supplied from the fuel supply tube 39, and oxygen or air is supplied from the oxygen (air) supply tube 40.

The methanol aqueous solution and the oxygen (or air) pass through a fuel supply part 35 and an oxygen supply part 36 each having a vent (not shown) and are supplied to the fuel electrode 32 and the oxygen electrode 33, respectively. The fuel supply part 35 also serves to electrically connect the fuel electrode 32 to the cell upper-half part 37, and the oxygen supply part 36 also serves to electrically connect the oxygen electrode 33 to the cell lower-half part 38.

In the fuel cell 1, the methanol as the fuel is supplied to the fuel electrode (anode) 32 as a low-concentration or high-concentration aqueous solution in general, and is oxidized to carbon dioxide in the oxidation catalyst layer 32*b* on the anode side as represented by the following equation (1).

$$\text{Anode: } CH_3OH + H_2O \rightarrow CO_2 + 6H^+ + 6e^- \quad (1)$$

The hydrogen ions generated at this time pass through the proton-conducting polymer electrolyte membrane 31, which separates the anode 32 and the cathode 33, and move to the cathode side. The hydrogen ions react with oxygen in the reduction catalyst layer of the oxygen electrode (cathode) 33 as represented by the following equation (2), so that water is produced.

$$\text{Cathode: } 6H^+ + (3/2)O_2 + 6e^- \rightarrow 3H_2O \quad (2)$$

The reaction occurring in the whole fuel cell 1 is represented by the following reaction equation (3), which results from the synthesis of equation (1) and equation (2).

$$\text{Whole DMFC: } CH_3OH + (3/2)O_2 \rightarrow CO_2 + 2H_2O \quad (3)$$

In general, in a fuel cell employing an organic liquid fuel, a solid polymer electrolyte membrane composed of a solid polymer ion-exchange resin is used as the electrolyte. In order for the fuel cell to function, hydrogen ions need to move in this membrane from the fuel electrode (anode) 32 to the oxygen electrode (cathode) 33. It is known that this movement of the hydrogen ions is accompanied by the movement of water, and it is necessary that at least a certain amount of water is contained in this membrane.

However, if an organic liquid fuel having high affinity to water, such as methanol, is used, the fuel cell has a problem that should be overcome, i.e. a problem that the organic liquid fuel shows diffusive movement in the solid polymer electrolyte membrane containing water and furthermore reaches the oxygen electrode (cathode) 33 (crossover). This crossover causes the lowering of the voltage, the power output, and the fuel conversion efficiency because the organic liquid fuel, which should provide electrons in the fuel electrode (anode) 32 originally, is oxidized on the oxygen electrode (cathode) 33 and therefore is not effectively used as the fuel. Therefore, it is important to control the power generation state of the fuel cell and optimize the rate of the fuel consumption by the fuel electrode (anode) 32.

WORKING EXAMPLES

The present embodiments will be described in further detail below based on the following non-limiting working examples.
<Fabrication of Fuel Cell>

As a single cell for forming the fuel cell 1, the DMFC shown in FIG. 3 was fabricated.

The fuel electrode (anode) 32 was fabricated in the following manner. Specifically, first, a catalyst (made by Tanaka Kikinzoku Kogyo K.K.) in which an alloy catalyst composed of platinum Pt and ruthenium Ru at a predetermined ratio was carried on carbon and a Nafion (registered trademark, made by Dupont Corporation)-dispersed aqueous solution (made by Wako Chemical Ltd.) were mixed with each other at a mass ratio of 7:3. Subsequently, ion-exchange water was added to the mixture to thereby adjust the viscosity of the mixture to appropriate viscosity, so that a paste mixture was fabricated. This paste mixture was applied on a carbon paper (made by Toray Industries, Inc.) as the electrically-conductive porous support 32*a* by a doctor blade method and then dried, so that the oxidation catalyst layer 32*b* was formed. It was cut into a square of 10 mm×10 mm to thereby be obtained as the fuel electrode (anode) 32.

Furthermore, the oxygen electrode (cathode) 33 was also fabricated in a similar manner. Specifically, first, a catalyst (made by Tanaka Kikinzoku Kogyo K.K.) in which a platinum catalyst was carried on carbon and a Nafion-dispersed aqueous solution (made by Wako Chemical Ltd.) were mixed with each other at a mass ratio of 7 to 3. Subsequently, ion-exchange water was added to the mixture to thereby adjust the viscosity of the mixture to appropriate viscosity, so that a paste mixture was fabricated. This paste mixture was applied on a carbon paper (made by Toray Industries, Inc.) as the electrically-conductive porous support 33*a* by a doctor blade method and then dried, so that the reduction catalyst layer 33*b* was formed. It was cut into a square of 10 mm×10 mm to thereby be obtained as the oxygen electrode (cathode) 33.

As the proton-conducting polymer electrolyte membrane 31, a Nafion 112 (trade name) membrane (made by Dupont Corporation) was cut into a square of 12 mm×12 mm. It was sandwiched between the fuel electrode (anode) 32 and the oxygen electrode (cathode) 33 and subjected to the thermocompression bonding for ten minutes under a condition of a temperature of 150° C. and a pressure of 1 MPa. Thereby, the membrane-electrode assembly (MEA) 34, in which the entire surfaces of the fuel electrode (anode) 32 and the oxygen electrode (cathode) 33 were opposed to each other with the intermediary of the proton-conducting polymer electrolyte membrane 31 therebetween, was fabricated.

The membrane-electrode assembly (MEA) 34 was sandwiched between a gold-plated stainless pressing plate that had a fuel supply port and served as the fuel supply part 35 and a gold-plated stainless pressing plate that had an air inlet and served as the oxygen supply part 36. Thereby, a single cell for the fuel cell 1 was obtained. On that occasion, short-circuiting between the fuel electrode (anode) 32 and the oxygen electrode (cathode) 33 was prevented by a Teflon (registered trademark) film.
<Fabrication of Power Supply System 10>

The fuel cell 1 was formed by connecting six of the above-described fuel cells in series. The optimum power generation voltage of the fuel cell 1 is about 1.8 V. As the lithium-ion secondary battery 3, a 250-mAh-class battery was used. The discharge voltage of the lithium-ion secondary battery 3 is about 3.0 to 4.2 V. In the experiment, the secondary battery subjected to the following process was used: the battery was full-charged to 4.2 V in advance and then discharged from the full-charged state with a constant current of 50 mA, and the discharge was ended at the timing when the discharge voltage reached 3.5 V. The output terminal of the fuel cell 1 was connected to the input terminal of the DC/DC converter 2, and the lithium-ion secondary battery 3 and the electronic load 4 were connected to the output terminal of the DC/DC converter 2 in parallel. Thereby, major part of the power supply system 10 was formed.

Furthermore, current detection resistors of 20 mΩ were disposed as the current measurement means 11, 13, and 14, and the values of the currents flowing through the respective units were measured by detecting the voltage drop across the current detection resistor.

Figure 4:
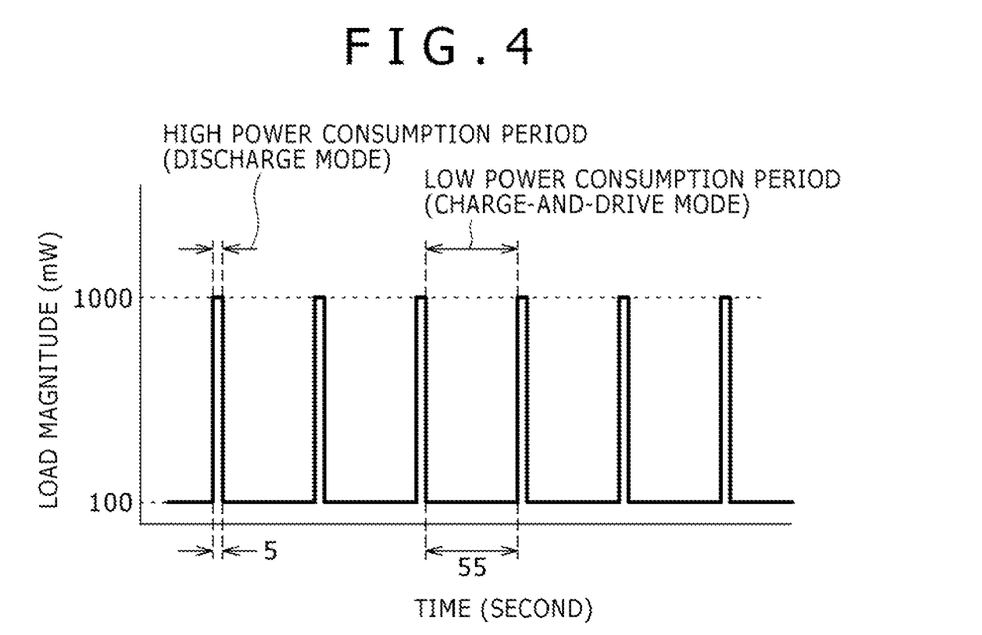
FIG. 4 is an explanatory diagram showing load variation and operating modes of the power supply system in working examples.

The power generation by the fuel cell 1 was performed at a room temperature in such a way that a methanol aqueous solution with a concentration of 80 wt % was supplied to the anode 32 with constant speed. Furthermore, for the power consumption of the electronic load 4, as shown in FIG. 4, a pattern in which a low power consumption period with 100 mW was continued for 55 seconds and thereafter a high power consumption period with 1 W existed for 5 seconds was repeated. The power supply system 10 operates in the charge-and-drive mode during the low power consumption period and operates in the discharge mode during the high power consumption period.

<Performance Evaluation of Power Supply System 10>

Working Example 1

The power supply system 10 was operated with such control by the microcomputer 5 that the difference between the target output voltage of the DC/DC converter 2 and the terminal voltage of the lithium-ion secondary battery 3 was changed and thereby 1.80±0.15 V could be kept as the input voltage of the DC/DC converter 2, i.e. the power generation voltage of the fuel cell 1.

As a result, it was confirmed that, during the low power consumption period, the lithium-ion secondary battery 3 was charged by the excess power from the fuel cell 1, not consumed by the electronic load 4, and the power supply system 10 operated in the charge-and-drive mode. Furthermore, it was confirmed that, during the high power consumption period, the power generated by the fuel cell 1 and the power discharged by the lithium-ion secondary battery 3 were supplied to the electronic load and the power supply system 10 operated in the discharge mode. In addition, it was also confirmed that the power from the fuel cell 1 was invariably supplied to the electronic load 4 both during the low power consumption period and during the high power consumption period. Moreover, electric energy of 504 mWh could be generated and it could be supplied to the electronic load 4 with use of 1 mL of the methanol aqueous solution with a concentration of 80 mass %.

In the test, also after the fuel for the fuel cell 1 had been exhausted and thus the power supply from the fuel cell 1 to the electronic load 4 had disappeared, the power supply from the lithium-ion secondary battery 3 to the electronic load 4 was continued. The test was ended at the timing when the voltage of the lithium-ion secondary battery 3 reached 3.5 V finally. This point also applies to working examples 2 to 5 and comparative examples 2 to 11 to be described later.

Working Example 2

The power supply system 10 was operated with such control by the microcomputer 5 that the difference between the target output voltage of the DC/DC converter 2 and the terminal voltage of the lithium-ion secondary battery 3 was changed and thereby 195±15 mA could be kept as the input current to the DC/DC converter 2, i.e. the power generation current of the fuel cell 1. As a result, electric energy of 443 mWh could be generated and it could be supplied to the electronic load 4 with use of 1 mL of a methanol aqueous solution with a concentration of 80 mass %.

Working Example 3

The power supply system 10 was operated with such control by the microcomputer 5 that the difference between the target output voltage of the DC/DC converter 2 and the terminal voltage of the lithium-ion secondary battery 3 was changed and thereby 350±35 mW could be kept as the input power to the DC/DC converter 2, i.e. the power generated by the fuel cell 1. As a result, electric energy of 487 mWh could be generated and it could be supplied to the electronic load 4 with use of 1 mL of a methanol aqueous solution with a concentration of 80 mass %.

Working Example 4

The power supply system 10 was operated with such control by the microcomputer 5 that the difference between the target output voltage of the DC/DC converter 2 and the terminal voltage of the lithium-ion secondary battery 3 was changed and thereby 90±5 mA could be kept as the output current of the DC/DC converter 2. As a result, electric energy of 452 mWh could be generated and it could be supplied to the electronic load 4 with use of 1 mL of a methanol aqueous solution with a concentration of 80 mass %.

Working Example 5

The power supply system 10 was operated with such control by the microcomputer 5 that the difference between the target output voltage of the DC/DC converter 2 and the terminal voltage of the lithium-ion secondary battery 3 was changed and thereby 330±10 mW could be kept as the output power of the DC/DC converter 2. As a result, electric energy of 496 mWh could be generated and it could be supplied to the electronic load 4 with use of 1 mL of a methanol aqueous solution with a concentration of 80 mass %.

Comparative Example 1

The fuel cell 1 used in working examples 1 to 5 was connected directly to the electronic load 4 and it was attempted to carry out a test with the same electronic load 4 as that in working example 1. However, the test could not be continued because power output of 1 W, necessary at the time of the high power consumption, could not be extracted from the fuel cell 1.

Comparative Example 2

The power supply system 10 was operated with such control by the microcomputer 5 that the difference between the target output voltage of the DC/DC converter 2 and the terminal voltage of the lithium-ion secondary battery 3 was changed and thereby 1.20±0.15 V could be kept as the input voltage of the DC/DC converter 2, i.e. the power generation voltage of the fuel cell 1. As a result, only electric energy of 184 mWh could be supplied to the electronic load 4 with use of 1 mL of a methanol aqueous solution with a concentration of 80 mass %. The cause of this will be that power generation with high fuel conversion efficiency was not performed in the fuel cell 1, and that the input voltage of the DC/DC converter 2 was low and energy loss in the DC/DC converter 2 was large.

Comparative Example 3

The power supply system 10 was operated with such control by the microcomputer 5 that the difference between the target output voltage of the DC/DC converter 2 and the terminal voltage of the lithium-ion secondary battery 3 was changed and thereby 2.20±0.15 V could be kept as the input voltage of the DC/DC converter 2, i.e. the power generation voltage of the fuel cell 1. As a result, only electric energy of 207 mWh could be supplied to the electronic load 4 with use of 1 mL of a methanol aqueous solution with a concentration of 80 mass %. The cause of this will be that power generation with high fuel conversion efficiency was not performed in the fuel cell 1.

Comparative Example 4

The power supply system 10 was operated with such control by the microcomputer 5 that the difference between the target output voltage of the DC/DC converter 2 and the terminal voltage of the lithium-ion secondary battery 3 was changed and thereby 90±20 mA could be kept as the input current to the DC/DC converter 2, i.e. the power generation current of the fuel cell 1. As a result, only electric energy of 260 mWh could be supplied to the electronic load 4 with use of 1 mL of a methanol aqueous solution with a concentration of 80 mass %. The cause of this will be that power generation with high fuel conversion efficiency was not performed in the fuel cell 1.

Comparative Example 5

The power supply system 10 was operated with such control by the microcomputer 5 that the difference between the target output voltage of the DC/DC converter 2 and the terminal voltage of the lithium-ion secondary battery 3 was changed and thereby 250±20 mA could be kept as the input current to the DC/DC converter 2, i.e. the power generation current of the fuel cell 1. As a result, only electric energy of 216 mWh could be supplied to the electronic load 4 with use of 1 mL of a methanol aqueous solution with a concentration of 80 mass %. The cause of this will be that power generation with high fuel conversion efficiency was not performed in the fuel cell 1, and that the input voltage of the DC/DC converter 2 was low and energy loss in the DC/DC converter 2 was large.

Comparative Example 6

The power supply system 10 was operated with such control by the microcomputer 5 that the difference between the target output voltage of the DC/DC converter 2 and the terminal voltage of the lithium-ion secondary battery 3 was changed and thereby 220±20 mW could be kept as the input power to the DC/DC converter 2, i.e. the power generated by the fuel cell 1. As a result, only electric energy of 222 mWh could be supplied to the electronic load 4 with use of 1 mL of a methanol aqueous solution with a concentration of 80 mass %. The cause of this will be that power generation with high fuel conversion efficiency was not performed in the fuel cell 1.

Comparative Example 7

The power supply system 10 was operated with such control by the microcomputer 5 that the difference between the target output voltage of the DC/DC converter 2 and the terminal voltage of the lithium-ion secondary battery 3 was changed and thereby 400±15 mW could be kept as the input power to the DC/DC converter 2, i.e. the output power of the fuel cell 1. As a result, only electric energy of 193 mWh could be supplied to the electronic load 4 with use of 1 mL of a methanol aqueous solution with a concentration of 80 mass %. The cause of this will be that power generation with high fuel conversion efficiency was not performed in the fuel cell 1.

Comparative Example 8

The power supply system 10 was operated with such control by the microcomputer 5 that the difference between the target output voltage of the DC/DC converter 2 and the terminal voltage of the lithium-ion secondary battery 3 was changed and thereby 40±10 mA could be kept as the output current of the DC/DC converter 2. As a result, only electric energy of 236 mWh could be supplied to the electronic load 4 with use of 1 mL of a methanol aqueous solution with a concentration of 80 mass %. The cause of this will be that power generation with high fuel conversion efficiency was not performed in the fuel cell 1.

Comparative Example 9

The power supply system 10 was operated with such control by the microcomputer 5 that the difference between the target output voltage of the DC/DC converter 2 and the terminal voltage of the lithium-ion secondary battery 3 was changed and thereby 120±10 mA could be kept as the output current of the DC/DC converter 2. As a result, only electric energy of 163 mWh could be supplied to the electronic load 4 with use of 1 mL of a methanol aqueous solution with a concentration of 80 mass %. The cause of this will be that power generation with high fuel conversion efficiency was not performed in the fuel cell 1, and that the input voltage of the DC/DC converter 2 was low and energy loss in the DC/DC converter 2 was large.

Comparative Example 10

The power supply system 10 was operated with such control by the microcomputer 5 that the difference between the target output voltage of the DC/DC converter 2 and the terminal voltage of the lithium-ion secondary battery 3 was changed and thereby 200±10 mW could be kept as the output power of the DC/DC converter 2. As a result, only electric energy of 216 mWh could be supplied to the electronic load 4 with use of 1 mL of a methanol aqueous solution with a concentration of 80 mass %. The cause of this will be that power generation with high fuel conversion efficiency was not performed in the fuel cell 1.

Comparative Example 11

A test with the same electronic load 4 as that in working example 1 was carried out by operating an electric energy supply system composed of the fuel cell 1 of working example 1 and the lithium-ion secondary battery 3 with such control that the difference between the set value of the voltage of the output terminal of the DC/DC converter 2 and the terminal voltage of the lithium-ion secondary battery 3 was changed and thereby 370±10 mW could be kept as the output power of the DC/DC converter 2. As a result, only 182 mWh could be supplied to the electronic load 4 with 1 mL of a methanol aqueous solution with a concentration of 80 wt %. The cause of this will be that power generation with high fuel conversion efficiency was not performed in the fuel cell 1, and that the input voltage of the DC/DC converter 2 was low and energy loss in the DC/DC converter 2 was large.

As is apparent from the above description, by connecting the fuel cell to the input terminal of the DC/DC converter and connecting the load and the electric energy storage means to the output terminal of the DC/DC converter in parallel to thereby allow the electric energy generated by the fuel cell to be input to the DC/DC converter and allow the electric energy output from the DC/DC converter to be supplied to both the load and the electric energy storage means, high energy can be drawn out from the fuel cell and high power output can be drawn out from the electric energy storage means. Therefore, the power supply system having both high energy density and high power density can be realized. Furthermore, the energy density can be further enhanced by appropriately controlling the difference between the set value of the output terminal voltage of the DC/DC converter and the terminal voltage of the electric energy storage means to thereby control the power generation status of the fuel cell. Thus, the battery life of electronic apparatus or the like as the power supply target can be extended.

The embodiments provide a power supply system that includes a fuel cell and has not only high energy density but also high power density, and assists, as a power supply, enhancement in the functions of portable electronic apparatus and increase in the number of the functions of the portable electronic apparatus.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A power supply system in which a fuel cell is connected to an input terminal of a direct-current voltage converter and a load and electric energy storage means are connected to an output terminal of the direct-current voltage converter in parallel, the power supply system comprising
measurement means configured to measure terminal voltage of said electric energy storage means and control means that sets target output voltage of the direct-current voltage converter based on the terminal voltage, wherein
said target output voltage is set higher than the terminal voltage,
said fuel cell is operated within a predetermined power generation condition,
if power that is generated by said fuel cell and output via said direct-current voltage converter is higher than power consumption of said load, charge of said electric energy storage means by said direct-current voltage converter is automatically performed and output voltage of said direct-current voltage converter is kept at a charge voltage of said electric energy storage means, and
if power that is generated by said fuel cell and output via said direct-current voltage converter is lower than power consumption of said load, discharge from said direct-current voltage converter to said load is automatically performed and output voltage of said direct-current voltage converter is kept at discharge voltage of said electric energy storage means wherein;
by power that is generated by said fuel cell and output via said direct-current voltage converter,
a charge mode in which only charge of said electric energy storage means is performed,
a charge-and-drive mode in which charge of said electric energy storage means and power supply to said load are performed, and
a drive mode in which only power supply to said load is performed are carried out, and
by power that is generated by said fuel cell and output via said direct-current voltage converter and discharge output of said electric energy storage means,
a discharge mode in which power supply to said load is performed is carried out.

2. The power supply system according to claim 1, wherein said target output voltage of said direct-current voltage converter is set slightly higher than said terminal voltage of said electric energy storage means.

3. The power supply system according to claim 2, wherein said target output voltage is adjusted and power generation by said fuel cell is controlled based on a difference between said target output voltage and said terminal voltage.

4. The power supply system according to claim 3, wherein power generation voltage of said fuel cell is controlled so as to fall within a predetermined range by changing said difference between said target output voltage and said terminal voltage.

5. The power supply system according to claim 3, wherein power generation current of said fuel cell is controlled so as to fall within a predetermined range by changing said difference between said target output voltage and said terminal voltage.

6. The power supply system according to claim 3, wherein power generated by said fuel cell is controlled so as to fall within a predetermined range by changing said difference between said target output voltage and said terminal voltage.

7. The power supply system according to claim 3, wherein output current of said direct-current voltage converter is controlled so as to fall within a predetermined range by changing said difference between said target output voltage and said terminal voltage.

8. The power supply system according to claim 3, wherein output power of said direct-current voltage converter is controlled so as to fall within a predetermined range by changing said difference between said target output voltage and said terminal voltage.

9. The power supply system according to claim 1, wherein said control means is formed of a microcomputer.

10. The power supply system according to claim 1, wherein said fuel cell is a direct methanol fuel cell.

11. The power supply system according to claim 1, wherein said electric energy storage means is a lithium-ion secondary battery.

* * * * *